United States Patent Office 2,916,486
Patented Dec. 8, 1959

2,916,486
6-FLUORO STEROIDS AND INTERMEDIATES THEREFOR

John C. Babcock, Portage Township, Kalamazoo County, and J Allan Campbell and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,553
14 Claims. (Cl. 260—239.55)

This invention relates to 6-fluoro-17α-hydroxyprogesterone and 17-acylates thereof and intermediates therefor. It relates more particularly to the novel compounds 5,6-oxido-3β,17α-dihydroxypregnan - 20 - one 3,17-diacylate, 5,6-oxido-3β,17α-dihydroxypregnan - 20 - one 17-acylate, 6β-fluoro - 3β,5α,17α - trihydroxypregnan - 20 - one 3,17-diacylate, 6β-fluoro-3β,5α,17α-trihydroxypregnan-20-one 17-acylate and processes for the production thereof. These novel compounds are useful as intermediates in the production of the physiologically active 6α-fluoro-17α-hydroxyprogesterone and the 17-acylates thereof. This invention is a continuation-in-part of our copending application Serial No. 699,452, filed November 29, 1957, now Patent No. 2,838,496 issued June 10, 1958.

The new compounds and the process of the present invention are illustratively represented by the following formulae:

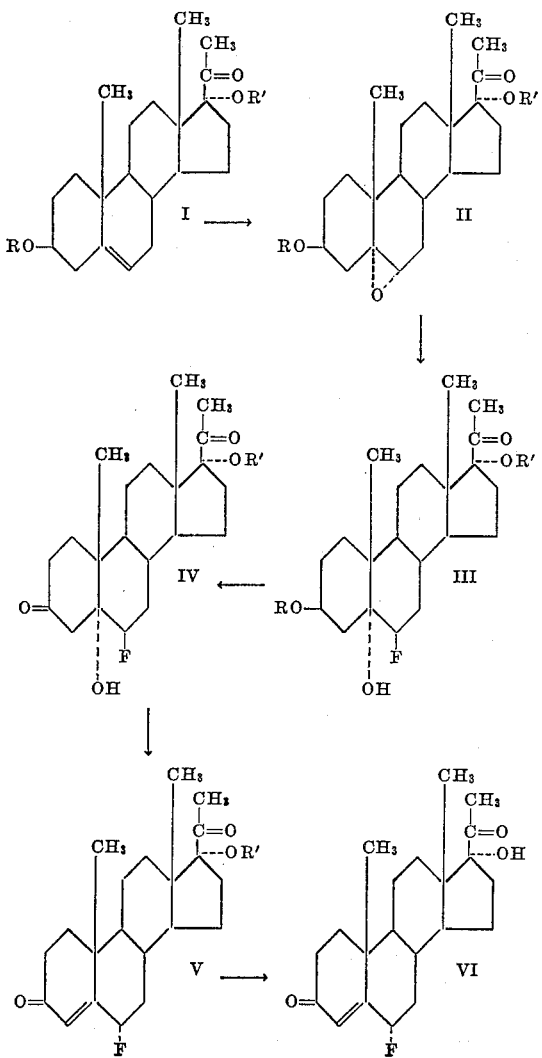

wherein R is hydrogen or R', and R' is the acyl radical of an organic carboxylic acid, preferably a hydrocarbon carboxylic acid containing from one to twelve carbon atoms, inclusive.

As used in this application, the Roman numeral following the name of a compound (or compounds) indicates the relation of the compound (or compounds) to the reaction scheme depicted above.

The processes illustrated above comprise reacting a 17α-hydroxypregnenolone 3,17-diacylate (I) dissolved in an inert organic solvent such as chloroform, methylene chloride, methylene dichloride, carbon tetrachloride, benzene or the like, with an organic peracid such as performic, peracetic, perbenzoic or other organic peracids. The reaction is generally carried out at low temperatures such as between minus ten and plus ten degrees centigrade. However, higher or lower temperatures, e.g., minus thirty to up to plus forty degrees centigrade are operable.

In the preferred embodiment of the invention temperatures between zero and plus five degrees, a chlorinated hydrocarbon such as chloroform or methylene dichloride and peracetic, perphthalic or perbenzoic acid are used. The peracid is usually used in a quantity from ten to twenty percent above to five times the amount theoretically required. At the end of the reaction, the mixture is neutralized, preferably with dilute sodium hydroxide, sodium or potassium carbonate or bicarbonate solution, washed with water and the thus produced mixture of 5α,6α-oxido-3β,17α-dihydroxypregnan - 20 - one 3,17-diacylate (II) and the corresponding 5β,6β-epimer recovered by evaporation of the solvents. When paracetic acid is used to form the 5,6-oxido compounds there is preferably added to the reaction mixture a dry alkali metal acrylate, for example, sodium acetate.

Chromatography of the mixture followed by recrystallization from organic solvents such as methanol, ethanol, Skellysolve B hexanes, heptanes, benzene, toluene, methylene chloride ether or the like, provides 5α,6α-oxido-3β,17α-dihydroxypregnan-20-one 3,17-diacylate (II) and its epimer 5β,6β-oxido-3β,17α-dihydroxypregnan-20-one 3,17-diacylate (II).

The thus obtained 5α,6α-oxido-3β,17α-dihydroxypregnan-20-one 3,17-diacylate, dissolved in a suitable organic solvent, is reacted with hydrogen fluoride to give 6β-fluoro-3β,5α,17α-trihydroxypregnan - 20 - one 3,17-diacylate (III). The hydrogen fluoride can be gaseous hydrogen fluoride, hydrofluoric acid in aqueous solution, e.g., in 48 percent strength, or a metal fluoride releasing hydrogen fluoride when treated by an acid as, for instance, potassium or sodium bifluoride and an acid such as acetic, propionic or mineral acids such as perchloric, sulfuric acid or the like.

The reaction can be performed at between about minus seventy and plus fifty degrees centigrade. If anhydrous hydrogen fluoride is used, usually low temperatures, e.g., temperatures between minus seventy and plus ten degrees, are preferred. The hydrogen fluoride, for example, can be allowed to enter from a hydrogen fluoride gas cylinder into a vessel not reactive toward hydrogen fluoride. If aqueous hydrogen fluoride is used the reaction can be carried out between zero degrees and room temperature. Similarly, when the hydrogen fluoride is produced in situ by the reaction of a metallic fluoride such as potassium bifluoride and an acid, reaction temperatures between zero to room temperature and even higher up to ninety degrees centigrade are useful. At low temperatures, solvents such as chloroform, methylene chloride, and particularly, tetrahydrofuran are used. In the reaction of the epoxide with potassium bifluoride and an acid, organic acids are preferred such as acetic acid, propionic acid, formic acid or the like. However, other solvents such as neopentyl alcohol, isopropanol and the like with mineral acids such as sulfuric acid, perchloric acid or the like can be used.

The reaction period is usually between fifteen minutes and four hours, with reaction times of approximately two to three hours usually being sufficient for anhydrous hydrogen fluoride. When potassium bifluoride is used, reaction periods of twelve hours to five days are employed. After the reaction is terminated the material is isolated by methods well known in the art, e.g., neutralizing the excess hydrogen fluoride with a base, e.g., sodium carbonate, potassium bicarbonate, sodium hydroxide, or the like, and extracting the product with water-immiscible solvents such as methylene chloride, chloroform, benzene, ether, hexanes and the like. Evaporation of the organic solvents gives the crude material, which is purified generally by recrystallization from organic solvents such as methanol, ethanol, acetone, Skellysolve B hexane, benzene, methylene chloride or the like, to give pure 6β-fluoro-3β,5α,17α-trihydroxypregnan-20-one 3,17-diacylate.

Crude, or purified 6β-fluoro-3β,5α,17α-trihydroxypregnan-20-one 3,17-diacylate (III) is hydrolyzed in a water-miscible solvent, preferably in an aqueous or acetone acidic medium. As solvent alkanols, methanol and ethanol are the preferred alkanols; however, other suitable water-miscible solvents such as tertiary butyl alcohol, propyl alcohol, isopropyl alcohol, dioxane, acetone, acetic acid or the like can be used.

The hydrolysis of 6β-fluoro-3β,5α,17α-trihydroxypregnan-20-one 3,17-diacylate is productive of 6β-fluoro-3β,5α,17α-trihydroxypregnan-20-one 17-acylate (III); and subsequent oxidation thereof with sodium dichromate in acetic acid yields 6β-fluoro-5α,17α-dihydroxypregnane-3,20-dione 17-acylate (IV). The crude product can be purified using known methods, for example, by recrystallization from organic solvents such as acetone, ethyl acetate, Skellysolve B hexanes, methanol, tertiary butyl alcohol, ether, or the like, or mixture thereof to give pure 6β-fluoro - 5α,17α - dihydroxypregnane - 3,20 - dione 17-acylate.

The thus obtained 6β-fluoro-5α,17α-dihydroxypregnane-3,20-dione 17-acylate is thereupon chemically dehydrated. Dehydration can be effected in alkali solution or in acidic solution. In the preferred embodiment of the present invention, acid dehydration is used. The compound (IV) is dissolved or suspended in solvents unreactive to the acid employed, e.g., methylene chloride, chloroform, dioxane, carbon tetrachloride and the like, and the selected acid is added to the solution or suspension. Acids particularly useful for this reaction are strong acids, e.g., gaseous hydrogen chloride or hydrogen bromide, sulfuric acid and the like, with gaseous hydrogen chloride preferred. For dehydration with alkali compound IV is dissolved in methanol, ethanol, dioxane, or other convenient solvents, unreactive to the base employed. The solution is purged of oxygen by bubbling nitrogen through the solution and then allowed to react with an oxygen-free alkali metal base solution. Sodium or potassium hydroxide are the preferred bases. However, alkali metal alkoxides, barium hydroxide, calcium hydroxide, or the like, can be used.

Depending on the amount of acid or base used, the 6α- and 6β-isomers are obtained. The dehydration produces at first the 6β-isomer, which, being less stable in strong acid or bases, rearranges to the 6α-isomer. If, at the start of the dehydration reaction the medium is strongly acidic, only 6α-fluoro-17α-hydroxyprogesterone 17-acylate is obtained. A weakly acidic or basic medium furnishes the 6β-fluoro-17α-hydroxyprogesterone 17-acylate, while a strongly basic medium furnishes the free alcohol as the α-epimer, i.e. 6α-fluoro-17α-hydroxyprogesterone. The 6β-isomer can subsequently be converted to the 6α-isomer by treatment with strong acid or base.

The thus obtained 6-fluoro-17α-hydroxyprogesterone 17-acylates or the free alcohol, 6-fluoro-17α-hydroxyprogesterone, obtained when more concentrated solution of strong base is used in the dehydration step, can be isolated respectively from the reaction mixture and purified by conventional procedures. Such procedures include diluting with water and either recovering by filtration or by extracting the mixture with a water-immiscible solvent, for example, methylene chloride, chloroform, hexanes, benzene, ether and the like, and then evaporating the solvent. The thus obtained solids are purified by conventional procedures, such as recrystallization from organic solvent, such as methanol, ethanol, Skellysolve B hexanes, ethyl acetate, benzene or the like to obtain the pure 6-fluoro-17α-hydroxyprogesterone or the 17-acylate thereof, respectively.

In the preferred embodiment of this invention 6-fluoro-17α-hydroxyprogesterone (VI) is prepared from 6-fluoro-17α-hydroxyprogesterone 17-acylate in a separate step by saponification. For this purpose the 6-fluoro-17α-hydroxyprogesterone 17-acylate is allowed to react with an alkali metal hydroxide such as sodium hydroxide, potassium hydroxide or a carbonate such as sodium or potassium carbonate, bicarbonate or the like or with an alkali earth metal hydroxide such as barium or calcium hydroxide in alcoholic solution at room temperature for a reaction time of from one to 24 hours to obtain the 6-fluoro-17α-hydroxyprogesterone. To isolate the product from the reaction mixture, the reaction mixture is first neutralized with aqueous acid such as aqueous acetic acid, aqueous hydrochloric or sulfuric acid and thereupon diluted with water and extracted with a water-immiscible organic solvent such as methylene chloride, chloroform, benzene, ether, or the like, and the extracts dried and evaporated to give the crude material. The crude material can then be recrystallized from organic solvents such as methanol, ethanol, acetone, Skellysolve B hexanes, ethyl acetate, methylene chloride or the like to give pure 6-fluoro-17α-hydroxyprogesterone. From the thus obtained 6-fluoro-17α-hydroxyprogesterone, esters can be prepared by esterification carried out by methods well established in the art of esterifying tertiary hydroxyl groups in the 17α-position of steroids of the pregnane series, e.g., Huang-Minlon et al., J. Am. Chem. Soc., 74, 5394 (1952). Huang-Minlon et al. describe both a "cold method" and a "hot method," both of which are equally useful in the esterification of 6α-fluoro-17α-hydroxyprogesterone. If in the esterification of the 6β-isomer, the β-isomers are desired, mild conditions are necessary (cold method, low amount of acid catalyst) since otherwise a conversion of the 6β-isomer to the 6α-isomer takes place.

An alternate process of the present invention comprises: reacting a 17α-hydroxypregnenolone 17-acylate (I) in a suitable solvent (e.g. chloroform, methylene chloride, benzene) with an organic peracid, e.g. peracetic acid, perbenzoic acid, perphthalic acid and the like to obtain 3β,17α-dihydroxy-5α,6α-oxidopregnan-20-one 17-acylate (II); treating the thus produced 3β,17α-dihydroxy-5α,6α-oxidopregnan-20-one 17-acylate with hydrogen fluoride to obtain 3β,5α17α-trihydroxy-6β-fluoropregnan-20-one 17-acylate (III); oxidizing the thus produced 3β,5α,17α-trihydroxy-6β-fluoropregnan-20-one 17-acylate with sodium dichromate in acetic acid to obtain 5α,17α-dihydroxy-6β-fluoropregnane-3,20-dione 17-acylate (IV); and dehydrating the thus obtained 5α,17α-dihydroxy-6β-fluoropregnane-3,20-dione 17-acylate with a base; or preferably, with an acid to obtain 6α-fluoro-17α-hydroxy-4-pregnene-3,20-dione 17-acylate (6α-fluoro-17α-hydroxyprogesterone 17-acylate) (V); saponification of 6α-fluoro-17α-hydroxyprogesterone 17-acylate to obtain 6α-fluoro-17α-hydroxyprogesterone (VI) is carried out by allowing the 17-acylate (V) to react with a base, e.g., sodium or potassium hydroxide, or for an extended period with an aqueous acid such as dilute hydrochloric acid. When peracetic acid is used to form the 5,6-oxido compound (II) there is preferably added to the reaction mixture a dry alkali metal acylate, for example, sodium acetate.

The starting compounds (I) are obtained by reacting the known 17α-hydroxypregnenolone with an anhydride of a hydrocarbon carboxylic acid containing from one to twelve carbon atoms, inclusive, in the presence of para-toluene-sulfonic acid to produce a 17α-hydroxypregnenolone 3,17-diacylate. Refluxing the 17α-hydroxypregnenolone 3,17-diacylate with concentrated strong mineral acid (e.g., hydrochloric acid) in a dry alcohol (e.g., ethanol or methanol) is productive of a 17α-hydroxypregnenolone 17-acylate (I).

The preparation of the starting compounds of this invention are illustrated in Preparations 1A and 1B, which follow.

The following preparations and examples are illustrative of the products and process of the present invention and are not to be construed as limiting.

PREPARATION 1A

17α-hydroxypregnenolone 3,17-diacetate

Ten grams of para-toluenesulfonic acid was added over a ten-minute period (with stirring under nitrogen) to a mixture of 25 grams of 17α-hydroxypregnenolone in 400 milliliters of acetic acid and 100 milliliters of acetic anhydride. The solution became clear after about a thirty-minute period. After another two-hour period the reatcion mixture was poured into ice-water and the precipitate collected, washed well with water and dried to yield 30.4 grams of product with a melting point of 166–178 degrees centigrade. Recrystallization from a mixture of acetone and Skellysolve B (hexane hydrocarbons) yielded 24.2 grams of pure 17α-hydroxypregnenolone 3,17-diacetate with a melting point of 179 to 181 degrees centigrade and rotation $[\alpha]_D$ minus 65 degrees in chloroform.

In a manner corresponding to that of the foregoing preparation, 17α-hydroxypregnenolone 3,17-dicaproate, 17α-hydroxypregnenolone 3,17-diphenylacetate, 17α-hydroxypregnenolone 3,17-di(β-cyclopentylpropionate), 17α-hydroxypregnenolone 3,17-diacrylate, 17α-hydroxypregnenolone 3,17-divalerate, 17α-hydroxypregnenolone 3,17-ditrimethylacetate, 17α-hydroxypregnenolone 3,17-di-t-butylacetate, 17α-hydroxypregnenolone 3,17-dicyclopentylcarboxylate, 17α-hydroxypregnenolone 3,17-diethylbutyrate, 17α-hydroxypregnenolone 3,17-dicyclohexylacetate, 17α-hydroxypregnenolone 3,17-di-o-toluate, 17α-hydroxypregnenolone 3,17-dimonoglutarate, 17α-hydroxypregnenolone 3,17-dimonodiglycolate, 17α-hydroxypregnenolone 3,17-dimono-β-methylglutarate, 17α-hydroxypregnenolone 3,17-dimono-β,β-dimethylglutarate, 17α-hydroxypregnenolone 3,17-diethoxyacetate, 17α-hydroxypregnenolone 3,17-dilaurate, 17α-hydroxypregnenolone 3,17-dibutyrate, 17α-hydroxypregnenolone 3,17-dipropionate, 17α-hydroxypregnenolone 3,17-diisovalerate, 17α-hydroxypregnenolone 3,17-dienanthate and 17α-hydroxypregnenolone 3,17-dicaprylate are prepared by dissolving 17α-hydroxypregnenolone in a solution comprising a mixture of the appropriate acid and its anhydride together with p-toluenesulfonic acid. The crude diester is isolated in accordance with the procedure of the foregoing preparation. If the corresponding acid or its anhydride is solid, an inert solvent such as benzene, chloroform or dioxane can be added to effect solution and to provide a liquid esterification reaction medium.

PREPARATION 1B

17α-hydroxypregnenolone 17-acetate 0.4 gram of 17α-hydroxypregnenolone 3,17-diacetate in fifteen milliliters of methanol and 0.13 milliliter of concentrated hydrochloric acid was refluxed for one hour. About half of the methanol was evaporated under a stream of nitrogen. 0.35 gram of product was flooded out with water, collected, dried and recrystallized from acetone to yield 17α-hydroxypregnenolone 17-acetate with a melting point of 224 to 228 degrees centigrade and rotation $[\alpha]_D$ minus 69 degrees in chloroform.

*Analysis.*—Calculated for $C_{23}H_{34}O_4$: C, 73.76; H, 9.15. Found: C, 73.64; H, 9.46.

In the same manner as in the foregoing preparation, substitution of one of the 17α-hydroxypregnenolone 3,17-diacylates disclosed in Preparation 1A as the starting steroid, is productive of the corresponding 17α-hydroxypregnenolone 17-acylate.

EXAMPLE 1

5,6-oxido-3β,17α-dihydroxypregnan-20-one 3,17-diacetates (II)

A solution of twenty grams of 17α-hydroxypregnenolone 3,17-diacetate and 2.5 grams of sodium acetate in 250 milliliters of chloroform was cooled to five degrees centigrade and 25 milliliters of forty percent peracetic acid added with stirring. After a period of three hours the solution was washed with water, dilute sodium hydroxide, again with water, dried, and the solvent removed. The residue resisted crystallization and was chromatographed through a 400 gram column of Florisil, a synthetic magnesium silicate. The β-oxide was eluted with six percent acetone in Skellysolve B and recrystallized from methanol to yield 3.17 grams of 5α,6β-oxido-3β,17α-dihydroxypregnan-20-one 3,17-diacetate, with a melting point of 168 to 173 degrees centigrade and rotation $[\alpha]_D$ minus 45 degrees in chloroform.

*Analysis.*—Calculated for $C_{25}H_{36}O_6$: C, 69.41; H, 8.39. Found: C, 69.72; H, 8.35.

The 5β,6β-oxido-3β,17α-dihydroxypregnan-20-one 3,17-diacetate thus produced possesses central nervous system regulating activity. The α-oxide was eluted with six to ten percent acetone in Skellysolve B and recrystallized from methanol to yield 8.0 grams of 5α,6α-oxido-3β,17α-dihydroxypregnan-20-one 3,17-diacetate with a melting point of 219 to 223 degrees centigrade and rotation $[\alpha]_D$ minus 61 degrees in chloroform.

*Analysis.*—Calculated for $C_{25}H_{36}O_6$: C, 69.41; H, 8.39. Found: C, 69.08; H, 8.31.

In the same manner as in the foregoing example, reacting other 3,17-diacylates of 17α-hydroxypregnenolone disclosed in Preparation 1A with peracetic acid and sodium acetate is productive of the corresponding 5α,6α-oxido-3β,17α - dihydroxy - pregnan-20-one 3,17-diacylates and 5β,6β - oxido - 3β,17α - dihydroxypregnan - 20 - one 3,17-diacylates.

EXAMPLE 2

5,6-oxido-3β,17α-dihydroxypregnan-20-one 17-acetates (II)

A solution of 150 grams of crude 17α-hydroxypregnenolone 17-acetate (obtained from Preparation 1B) dissolved in about six liters of benzene was cooled to fifteen degrees centigrade and seventeen grams of anhydrous sodium acetate was added, followed by 170 milliliters of forty percent peracetic acid with stirring. The temperature of the reactants was kept at fifteen degrees centigrade for a period of about 2.25 hours, then the solution was washed twice with water accompanied by very gentle swirling. Vigorous shaking during the third washing with water caused the α-oxide (II) to precipitate. It was collected, washed with water and benzene and dried to yield 95 grams with a melting point of 248 to 249 degrees centigrade. Recrystallization from acetone gave pure 5α,6α-oxido-3β,17α-dihydroxypregnan-20-one 17-acetate with a melting point of 251 to 252 degrees centigrade and rotation $[\alpha]_D$ minus 71 degrees in chloroform.

*Analysis.*—Calculated for $C_{23}H_{34}O_5$: C, 70.74; H, 8.77. Found: C, 70.43; H, 8.97.

An additional 24.7 grams of 5α,6α-oxido-3β,17α-dihydroxy-pregnan-20-one 17-acetate with a melting point of 238 to 244 degrees centigrade was obtained from the benzene filtrate.

The mother liquor of the second crop after several days deposited large chunks along with smaller crystals. The chunks were hand separated and recrystallized twice from benzene to yield 0.6 gram of 5β,6β-oxido-3β,17α-dihydroxy-pregnan-20-one 17-acetate with a melting point of 227 to 229 degrees centigrade and rotation $[\alpha]_D$ minus nineteen degrees in chloroform.

*Analysis.*—Calculated for $C_{23}H_{34}O_5$: C, 70.74; H, 8.77. Found: C, 71.10; H, 8.97.

5β,6β-oxido-3β,17α-dihydroxypregnan-20-one 17-acetate possesses central nervous system regulating activity.

In a manner similar to that of the foregoing example, substitution of another 17α-hydroxypregnenolone 17-acylate as the starting steroid is productive of the corresponding 5α,6α-oxido-3β,17α-dihydroxypregnan-20-one 17-acylate and 5β,6β-oxido-3β,17α-dihydroxypregnan-20-one 17-acylate. Representative compounds thus prepared are 5,6 - oxido - 3β,17α - dihydroxypregnan - 20 - one 17-caproate, 5,6-oxido-3β,17α-dihydroxypregnan-20-one 17-phenylacetate, 5,6-oxido-3β,17α-dihydroxypregnan-20-one 17(β-cyclopentylpropionate), 5,6-oxido-3β, 17α-dihydroxypregnan-20-one 17-acrylate, 5,6-oxido-3β,17α-dihydroxypregnan-20-one 17-valerate, 5,6-oxido dihydroxypregnan-20-one 17-trimethylacetate, 5,6-oxido-3β,17α-dihydroxypregnan-20-one 17-(t-butylacetate), 5,6-oxido-3β,17α-dihydroxypregnan-20-one 17-cyclopentylcarboxylate, 5,6-oxido-3β,17α-dihydroxypregnan-20-one 17-ethylbutyrate, 5,6-oxido-3β,17α-dihydroxypregnan-20-one 17-cyclohexylacetate, 5,6-oxido - 3β,17α - dihydroxypregnan-20-one 17-(o-toluate) 5.6-oxido-3β,17α-dihydroxypregnan-20-one 17-monoglutarate, 5,6 - oxido - 3β,17α - dihydroxypregnan-20-one 17 - monodiglycolate, 5,6-oxido-3β,17α-dihydroxypregnan-20-one 17-(mono-β,β-dimethylglutarate), 5,6-oxido - 3β,17α-dihydroxypregnan-20-one 17-ethoxyacetate, 5,6-oxido-3β,17α-dihydroxypregnan-20-one 17-laurate, 5,6-oxido-3β,17α-dihydroxypregnan-20-one 17-butyrate, 5,6-oxido dihydroxypregnan-20-one 17-propionate, 5,6-oxido-3β,17α-dihydroxy-pregnan-20-one 17-valerate, 5,6 - oxido - 3β,17α - dihydroxypregnan - 20 - one 17-enanthate, 5,6-oxido-3β,17α-dihydroxy-pregnan-20-one 17-caprylate and the like.

EXAMPLE 3

*6β-fluoro-3β,5α,17α-trihydroxypregnan-20-one 3,17-diacetate (III)*

Ten milliliters of cooled methylene chloride was added to 1.5 grams of hydrogen fluoride cooled in a Dry Ice-acetone bath. 4.3 grams of 5α,6α-oxido-3β,17α-dihydroxypregnan-20-one 3,17-diacetate (II) in twenty milliliters of cooled methylene chloride was added to the hydrogen fluoride-methylene chloride. The resulting solution was allowed to stand at room temperature for four hours, then two milliliters of pyridine was added. The methylene chloride was removed and water added. The gummy insoluble material was separated and washed thoroughly with ether to give clean crystals. This product was recrystallized from acetone to yield 1.2 grams 6β-fluoro-3β,5α,17α-trihydroxypregnan - 20 - one 3,17-diacetate with a melting point of 253 degrees centigrade and an optical rotation of $[\alpha]_D$ minus 33 degrees in chloroform.

*Analysis.*—Calculated for $C_{25}H_{27}FO_8$: C, 66.35; H, 8.25; F, 4.20. Found: C, 66.14; H, 8.25; F, 4.15.

In the same manner as in the foregoing example, substituting as the starting steroid one of the 5α,6α-oxido-3β,17α - dihydroxypregnan - 20 - one 3,17 - diacylates disclosed in Example 2 is productive of the corresponding 6β-fluoro-3β,5α,17α-trihydroxypregnan-20-one 3,17-diacylate.

EXAMPLE 4

*6β-fluoro-3β,5α,17α-trihydroxypregnan-20-one 17-acetate (III)*

39 milliliters of precooled chloroform and 98 milliliters of precooled tetrahydrofuran were added with swirling to 53 grams of hydrogen fluoride in a polyethylene bottle cooled in a Dry Ice-acetone bath. This solution was added to a solution (cooled in a Dry Ice-acetone bath) of 45 grams of 5α,6α-oxido-3β,17α-dihydroxypregnan-20-one 17-acetate (II) in 200 milliliters of chloroform. After storing at fifteen degrees centigrade for 2.25 hours the reaction mixture was poured into one liter of ice-water containing 100 milliliters of pyridine. The upper aqueous phase was extracted twice with methylene chloride. The extracts were combined with the lower chloroform phase and washed with dilute hydrochloric acid, water, dilute sodium carbonate and again with water. Each aqueous phase was back extracted with the same methylene chloride solution and the combined extracts were dried over magnesium sulfate, filtered and concentrated to dryness. the residue was a glassy solid.

From a similar run the product was obtained as a crystalline monohydrate by recrystallization from aqueous methanol to yield 6β-fluoro-3β,5α,17α-trihydroxypregnan-20-one 17-acetate with a melting point of 224 to 228 degrees centigrade and an optical rotation $[\alpha]_D$ of plus 21 degrees in chloroform.

*Analysis.*—Calculated for $C_{23}H_{35}FO_5 \cdot H_2O$: C, 64.46; H, 8.70; F, 4.41. Found: C, 64.98; H, 8.91; F, 4.16.

In the same manner as in the foregoing example, substituting as the starting compound one of the 5α, 6α-oxido-3β,17α-dihydroxypregnan-20-one 17-acylates disclosed in Example 2 is productive of the corresponding 6β-fluoro-3β,5α,17α-trihydroxypregnan-20-one 17-acylate.

EXAMPLE 5

*6α-fluoro-3β,5α,17α-trihydroxypregnan-20-one 17-actate (III)*

A solution of 1.2 grams of 6β-fluoro-3β,5α,17α-trihydroxypregnan-20-one 3,17-diacetate (III), fifty milliliters of methanol and 0.5 milliliter of concentrated hydrochloric acid was refluxed for one hour. About half of the methanol was evaporated under a stream of nitrogen. The product was flooded out with water, collected, dried and crystallized from acetone to give 1.15 grams of 6β-fluoro - 3β,5α,17α - trihydroxypregnan-20-one 17-acetate (III).

In the same manner as in the foregoing example, reacting other 6β-fluoro-3β,5α,17α-trihydroxypregnan-20-one 3,17-diacylates dissolved in an alcohol with a strong mineral acid (e.g., concentrated hydrochloric) is productive of the corresponding 6β-fluoro-3β,5α,17α-trihydroxypregnan-20-one 17-acylates.

EXAMPLE 6

*6β-fluoro-5α,17α-dihydroxypregnan-3,20-dione 17-acetate (IV)*

Forty grams of 6β-fluoro-3β,5α,17α-trihydroxypregnan-20-one 17-acetate (III) was dissolved in 500 milliliters of acetic acid and 45 grams of sodium dichromate dihydrate in 450 milliliters of acetic acid was immediately added to the steroid solution with swirling and cooling in a water bath for about five minutes. The reaction mixture was allowed to stand at room temperature for about 1.5 hours. The solution was cooled to fifteen degrees centigrade and the product filtered off and washed twice with small portions of methanol. After drying the product weighed 34.7 grams and had a melting point of 246 to 250 degrees centigrade. Recrystallization from boiling methanol yielded 6β-fluoro-5α,17α-dihydroxypregnane - 3,20 - dione 17-acetate (IV) with a melting point of 265 to 267.5 degrees centigrade.

In the same manner as in the foregoing example, other 6β-fluoro-3β,5α,17α-trihydroxypregnan-20-one 17-acylates (III) disclosed in Example 5 when dissolved in acetic acid and oxidized with sodium dischromate dihydrate are productive of the corresponding 6β-fluoro-5α,17α-dihydroxypregnan-3,20-dione 17-acylates.

EXAMPLE 7

*6α-fluoro-17α-hydroxyprogesterone 17-acetate (V)*

A slurry of ten grams of 6β-fluoro-5α,17α-dihydroxypregnane-3,20-dione 17-acetate (IV) in 100 milliliters of chloroform and one milliliter of absolute ethanol was cooled to minus five degrees centigrade in an ice-salt bath and then saturated with hydrogen chloride. After four hours nitrogen was bubbled through the reaction mixture, followed by washing twice with water, once with sodium bicarbonate solution and again with water. After drying and filtering, the solvent was removed and the residue recrystallized from a mixture of acetone and Skellysolve B (hexane hydrocarbons). A yield of 6.1 grams of 6α-fluoro-17α-hydroxyprogesterone 17-acetate (V) was obtained with a melting point of 252 to 256 degrees centigrade (with decomposition). Recrystallization of a second crop of the product gave 0.7 gram having a melting point of 248 to 255 degrees centigrade.

In the same manner as in the foregoing example, reacting other 6β-fluoro-5α,17α-dihydroxypregnane-3,20-dione 17-acylates (IV) in chloroform solution with hydrogen chloride is productive of the corresponding 6α-fluoro-17α-hydroxyprogesterone 17-acylates (V).

EXAMPLE 8

*6α-fluoro-17α-hydroxyprogesterone (VI)*

A solution of 1.9 grams of 6α-fluoro-17α-hydroxyprogesterone 17-acetate (V) in fifty milliliters of one percent sodium hydroxide in ninety percent methanol and twenty milliliters of methylene chloride was purged with nitrogen. After standing overnight at room temperature the solution was diluted with methylene chloride and washed three times with water. The aqueous phases were back extracted with methylene chloride. The extracts were combined, dried and concentrated to about twenty milliliters and poured onto a 150 gram chromatographic column of Florisil (synethetic magnesium silicate). After washing the column with increasing amounts of acetone in Skellysolve B, the product was eluted with two to eight percent of acetone in 1:1 mixtures of Skellysolve B and methylene chloride. Recrystallization from a mixture of acetone and Skellysolve B yielded 0.75 gram of 6α-fluoro-17α-hydroxyprogesterone (VI) with a melting point of 234 to 237 degrees centigrade, $\lambda_{max.}^{alc.}$ 236 mμ

($a_M$ 15,775) and an optical rotation $[\alpha]_D$ plus 79 degrees in chloroform.

*Analysis.*—Calculated for $C_{21}H_{29}FO_3$: C, 72.38; H, 8.39; F, 5.45. Found: C, 72.18; H, 8.59, F, 5.17.

Reacting other 6α-fluoro-17α-hydroxyprogesterone 17-acylates (V) disclosed in Example 7, in the same manner as in Example 8, is also productive of 6α-fluoro-17α-hydroxyprogesterone (VI).

EXAMPLE 9

*3-(N-pyrrolidinyl)-6-fluoro-17α-hydroxyprogesterone 17-acetate*

A mixture of 2.1 grams of 6α- and 6β-fluoro-17α-hydroxyprogesterone 17-acetate (V) was dissolved in fifty milliliters of methanol containing a little methylene chloride to aid in dissolving the steroid. The solution was filtered to remove foreign particles then concentrated to about 25 milliliters. Nitrogen was bubbled through the solution and 1.5 milliliters of pyrrolidine was added. The solution was boiled for about three minutes then seeded. The precipitate was collected and washed with a small amount of cold methanol to yield 1.0 gram of the 3-enamine of 6-fluoro-17α-hydroxyprogesterone 17-acetate having a melting point of 208 to 218 degrees centigrade (with decomposition), rotation $[\alpha]_D$ minus 174 degrees in pyridine, $\lambda_{max}^{methanol}$ 276 mμ, $a_M = 19,150$, $\lambda_{max}^{ether}$ 276 mμ, $a_M = 23,725$

*Analysis*—Calculated for $C_{27}H_{38}FNO_3$: C, 73.10; H, 8.63; F, 4.28; N, 3.16. Found: C, 73.11; H, 8.71; F, 3.98; N, 3.38.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6β-fluoro-3β,5α,17α - trihydroxypregnan-20-one 17-acylate, wherein the acyl group is of a hydrocarbon carboxylic acid containing from one to twelve carbon atoms, inclusive.

2. 6β-fluoro-3β,5α,17α - trihydroxypregnan-20-one 17-acetate.

3. 6β-fluoro-3β,5α,17α-trihydroxypregnan-20-one 3,17-diacylate, wherein the acyl radical is of a hydrocarbon carboxylic acid containing from one to twelve carbon atoms, inclusive.

4. 6β-fluoro-3β,5α,17α-trihydroxypregnan-20-one 3,17-diacetate.

5. 5,6-oxido-3β,17α - dihydroxypregnan-20-one 3,17-diacylate, wherein the acyl group is of a hydrocarbon carboxylic acid containing from one to twelve carbon atoms, inclusive.

6. 5α,6α-oxido-3β,17α - dihydroxypregnan-20-one 3,17-diacylate, wherein the acyl group is of a hydrocarbon carboxylic acid containing from one to twelve carbon atoms, inclusive.

7. 5β,6β-oxido-3β,17α - dihydroxypregnan-20-one 3,17-diacylate, wherein the acyl group is of a hydrocarbon carboxylic acid containing from one to twelve carbon atoms, inclusive.

8. 5α,6α-oxido-3β,17α - dihydroxypregnan-20-one 3,17-diacetate.

9. 5β,6β-oxido-3β,17α - dihydroxypregnan-20-one 3,17-diacetate.

10. 5,6-oxido-3β,17α-dihydroxypregnan - 20 - one 17-acylate, wherein the acyl group is of a hydrocarbon carboxylic acid containing from one to twelve carbon atoms, inclusive.

11. 5α,6α-oxido-3β,17α - dihydroxypregnan-20-one 17-acylate, wherein the acyl group is of a hydrocarbon carboxylic acid containing from one to twelve carbon atoms, inclusive.

12. 5β,6β-oxido-3β,17α - dihydroxypregnan-20-one 17-acylate, wherein the acyl group is of a hydrocarbon carboxylic acid containing from one to twelve carbon atoms, inclusive.

13. 5α,6α-oxido-3β,17α - dihydroxypregnan-20-one 17-acetate.

14. 5β,6β-oxido-3β,17α - dihydroxypregnan-20-one 17-acetate.

References Cited in the file of this patent

UNITED STATES PATENTS 2,838,496     Babcock et al.            June 10, 1958